US011282052B2

United States Patent
Xu et al.

(10) Patent No.: US 11,282,052 B2
(45) Date of Patent: Mar. 22, 2022

(54) PAYMENT CHANNEL RECOMMENDATION

(71) Applicant: Advanced New Technologies Co., Ltd., George Town (KY)

(72) Inventors: Runyu Xu, Hangzhou (CN); Zhe Wang, Hangzhou (CN); Renqiang Xie, Hangzhou (CN); Jianan Su, Hangzhou (CN); Hui Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,007

(22) Filed: Feb. 27, 2020

(65) Prior Publication Data

US 2020/0356964 A1 Nov. 12, 2020

Related U.S. Application Data

(63) Continuation of application No. PCT/CN2020/071867, filed on Jan. 14, 2020.

(30) Foreign Application Priority Data

May 6, 2019 (CN) .......................... 201910377788.0

(51) Int. Cl.
*G06Q 20/10* (2012.01)
*G06N 3/08* (2006.01)
(Continued)

(52) U.S. Cl.
CPC ........... *G06Q 20/102* (2013.01); *G06N 3/088* (2013.01); *G06Q 20/227* (2013.01); *G06Q 20/405* (2013.01)

(58) Field of Classification Search
None
See application file for complete search history.

(56) References Cited

U.S. PATENT DOCUMENTS

| 8,572,083 | B1 * | 10/2013 | Snell | G06F 16/287 |
| | | | | 707/736 |
| 9,135,559 | B1 * | 9/2015 | Chan | G06F 16/248 |

(Continued)

FOREIGN PATENT DOCUMENTS

| CN | 106355391 | 1/2017 |
| CN | 107403316 | 11/2017 |

(Continued)

OTHER PUBLICATIONS

Alexey Kurakin, Ian J. Goodfellow, and Samy Bengio. "Adversarial Machine Learning at Scale". Feb. 11, 2017. International Conference on Learning Representations 2017 (ICLR 2017). https://research.google/pubs/pub45816/ (Year: 2017).*

(Continued)

*Primary Examiner* — Narayanswamy Subramanian
*Assistant Examiner* — Ayal I. Sharon
(74) *Attorney, Agent, or Firm* — Fish & Richardson P.C.

(57) ABSTRACT

A computer-implemented method includes: determining a target user corresponding to a payment request and a plurality of payment channels corresponding to the payment request; obtaining payment features based on the target user and the plurality of payment channels, in which the payment features include features representing historical characteristics of one or more payments made by the target user using one or more of the plurality of payment channels; determining, based on the payment features, a recommendation score corresponding to each of the plurality of payment channels in accordance with a prediction model; and generating, based on the determined recommendation scores of the plurality of payment channels, a recommendation including at least one of: a selection of at least one of the plurality of payment channels, and a manner of presentation of at least one of the plurality of payment channels.

20 Claims, 6 Drawing Sheets

(51) Int. Cl.
*G06Q 20/40* (2012.01)
*G06Q 20/22* (2012.01)

(56) References Cited

U.S. PATENT DOCUMENTS

| | | | | |
|---|---|---|---|---|
| 10,387,921 | B1* | 8/2019 | Lewis | G06Q 30/0275 |
| 10,402,064 | B1* | 9/2019 | Al-Sallami | G06Q 20/20 |
| 10,496,999 | B2* | 12/2019 | Jin | G06Q 20/405 |
| 10,528,858 | B1* | 1/2020 | Murphy | G06K 19/06187 |
| 10,567,237 | B1* | 2/2020 | Powell | H04L 41/16 |
| 10,706,453 | B1* | 7/2020 | Morin | G06N 20/20 |
| 2014/0122137 | A1* | 5/2014 | Nelson | G06Q 30/0201 705/7.11 |
| 2014/0279473 | A1* | 9/2014 | Hammock | G06Q 30/06 705/41 |
| 2014/0310159 | A1 | 10/2014 | Zoldi et al. | |
| 2015/0019567 | A1* | 1/2015 | Li | G06F 3/0482 707/748 |
| 2016/0034861 | A1* | 2/2016 | Jin | G06Q 20/405 705/39 |
| 2016/0055570 | A1* | 2/2016 | Fan | G06Q 20/12 705/26.7 |
| 2017/0019500 | A1* | 1/2017 | Yan | G06Q 30/0609 |
| 2017/0053336 | A1* | 2/2017 | Barbour | G06F 16/9535 |
| 2017/0124487 | A1* | 5/2017 | Szeto | G06F 11/1448 |
| 2017/0270534 | A1* | 9/2017 | Zoldi | G06Q 20/4016 |
| 2018/0131628 | A1* | 5/2018 | Castinado | H04L 67/10 |
| 2018/0204113 | A1* | 7/2018 | Galron | G06K 9/6267 |
| 2019/0013024 | A1* | 1/2019 | Jeon | G10L 15/26 |
| 2019/0095879 | A1* | 3/2019 | Eyal | G06Q 20/06 |
| 2019/0180255 | A1* | 6/2019 | Deshpande | G06Q 20/322 |
| 2019/0251149 | A1* | 8/2019 | Moyers | G06F 40/137 |
| 2019/0279767 | A1* | 9/2019 | Bates | G16H 15/00 |
| 2020/0074523 | A1* | 3/2020 | Wang | G06N 20/00 |
| 2020/0193443 | A1* | 6/2020 | Piel | G06Q 20/3823 |
| 2020/0213085 | A1* | 7/2020 | Fletcher | H04L 9/3255 |
| 2020/0311585 | A1* | 10/2020 | Helenius | G06Q 30/0202 |
| 2021/0042362 | A1* | 2/2021 | Ahn | G06F 3/0488 |

FOREIGN PATENT DOCUMENTS

| | | | | |
|---|---|---|---|---|
| CN | 107464108 | | 12/2017 | |
| CN | 107679849 | | 2/2018 | |
| CN | 107967530 | A * | 4/2018 | |
| CN | 108399195 | | 8/2018 | |
| CN | 108734460 | | 11/2018 | |
| CN | 109146451 | | 1/2019 | |
| CN | 109359961 | | 2/2019 | |
| CN | 109711887 | A * | 5/2019 | |
| CN | 110245935 | A * | 9/2019 | |
| CN | 110246043 | A * | 9/2019 | |
| CN | 110288334 | A * | 9/2019 | |
| WO | WO-2018205817 | A1 * | 11/2018 | G06F 16/00 |

OTHER PUBLICATIONS

"What Does Deep Neural Network Mean?" Technopedia. Copyright © 2021. https://www.techopedia.com/definition/32902/deep-neural-network (Year: 2021).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bltcoin.org, 2005, 9 pages.

PCT International Search Report and Written Opinion in International Application No. PCT/CN2020/071867, dated Apr. 13, 2020, 14 pages (with partial machine translation).

* cited by examiner

PAYMENT CHANNEL RECOMMENDATION

CROSS-REFERENCE TO RELATED APPLICATIONS

This application is a continuation of PCT Application No. PCT/CN2020/071867, filed on Jan. 14, 2020, which claims priority to Chinese Patent Application No. 201910377788.0, filed on May 6, 2019, and each application is hereby incorporated by reference in its entirety.

TECHNICAL FIELD

The present specification relates to the field of computer technologies, and in particular, to payment channel recommendation methods, apparatuses, and devices.

BACKGROUND

At present, people use various payment platforms more frequently to make payment for transaction settlement. In such case, the payment platforms usually provide users with multiple payment channels for transaction settlement, for example, the payment channels that have been opened by the users in the payment platforms, such as an account balance, a bank card account, a credit card account, a third-party wallet, a coupon, a red envelope, and a bonus point.

SUMMARY

In view of the previous description, implementations of the present specification provide payment channel recommendation methods, apparatuses, and devices, to recommend a payment channel to a user during payment process, thereby improving the payment efficiency and the user's payment experience.

The following technical solutions are used in the implementations of the present specification:

An implementation of the present specification provides a payment channel recommendation method, including the following: when a payment request is received, determining a target user corresponding to the payment request and multiple target payment channels corresponding to the payment request; obtaining payment features based on the target user and the multiple target payment channels, where the payment features include crossing features between the target user and the target payment channels, and the crossing features are used to represent historical performance of payments made by the target user by using the target payment channels; determining a recommendation score corresponding to each of the multiple target payment channels based on a mapping relationship and based on the payment features, where the mapping relationship is predetermined through training on historical data of the payment features and historical data of payment result features, and is used to represent relationships between the payment channels and the recommendation scores, and the payment result features include result data specifying whether the payment channel is selected by a user and whether the payment is successful; and recommending the target payment channel based on the recommendation score.

An implementation of the present specification further provides a payment channel recommendation apparatus, including a first determining module, an acquisition module, a second determining module, and a recommendation module, where the first determining module is configured to: when a payment request is received, determine a target user corresponding to the payment request and multiple target payment channels corresponding to the payment request; the acquisition module is configured to obtain payment features based on the target user and the multiple target payment channels, where the payment features include crossing features between the target user and the target payment channels, and the crossing features are used to represent historical performance of payment made by the target user by using the target payment channels; the second determining module is configured to determine a recommendation score corresponding to each of the multiple target payment channels based on a mapping relationship and based on the payment features, where the mapping relationship is predetermined through training on historical data of the payment features and historical data of payment result features, and is used to represent relationships between the payment channels and the recommendation scores, and the payment result features include result data specifying whether the payment channel is selected by a user and whether payment is successful; and the recommendation module is configured to recommend the target payment channel based on the recommendation score.

An implementation of the present specification further provides a payment channel recommendation electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: when a payment request is received, determining a target user corresponding to the payment request and multiple target payment channels corresponding to the payment request; obtaining payment features based on the target user and the multiple target payment channels, where the payment features include crossing features between the target user and the target payment channels, and the crossing features are used to represent historical performance of payment made by the target user by using the target payment channels; determining a recommendation score corresponding to each of the multiple target payment channels based on a mapping relationship and based on the payment features, where the mapping relationship is predetermined through training on historical data of the payment features and historical data of payment result features, and is used to represent relationships between the payment channels and the recommendation scores, and the payment result features include result data specifying whether the payment channel is selected by a user and whether payment is successful; and recommending the target payment channel based on the recommendation score.

The previous at least one technical solution used in the implementations of the present specification can achieve the following beneficial effects: A payment channel is scored and recommended for each specific user in the current transaction based on a mapping relationship. The mapping relationship is predetermined through training on the historical data of the payment features and the historical data of the payment result features, the payment features include the payment performance of the user using the payment channels, and the payment result features include the payment success rate and the user willingness rate of the payment channels. As such, the mapping relationship is trained by using both the payment features and the payment result features, so that the mapping relationship can well predict the payment behavior of the user using the payment channel, thereby accurately recommending the payment channel with a high payment success rate that may be selected by the user in a timely way, reducing the possibility of re-selection by the user, and improving the payment efficiency and the user's payment experience.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following descriptions merely show multiple implementations of the present specification, and a person of ordinary skill in the art can still derive other drawings from these accompanying drawings without creative efforts.

DESCRIPTION OF IMPLEMENTATIONS

Figure 1:
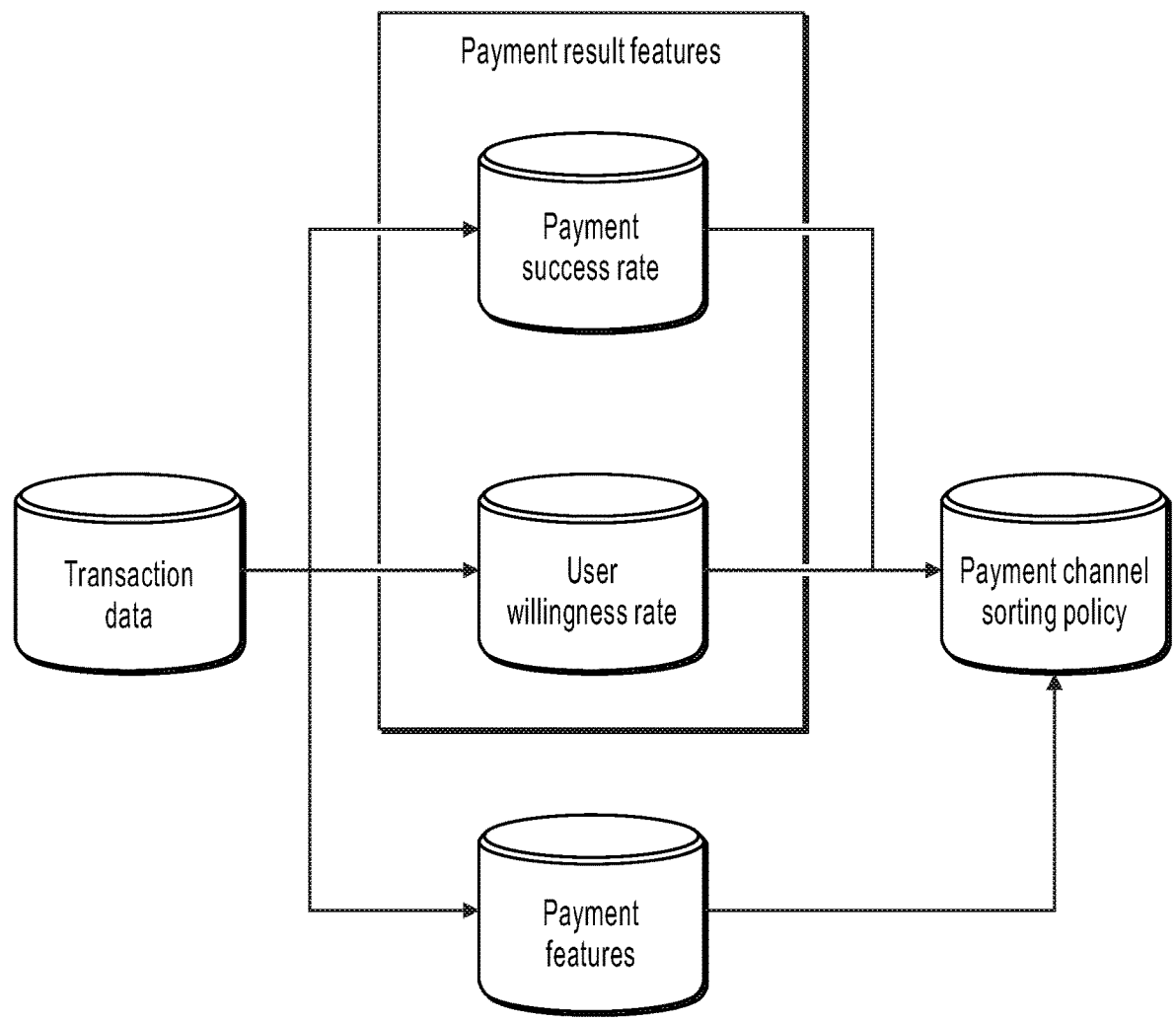
FIG. 1 is a schematic diagram illustrating an overall idea of a recommendation sorting policy for a payment channel recommendation method, according to an implementation of the present specification.

To make a person skilled in the art better understand the technical solutions in the present specification, the following clearly describes the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification without creative efforts shall fall within the protection scope of the present application.

In an existing payment channel recommendation solution, a payment channel is usually recommended only based on multiple payment features of the payment channel. For example, the payment features include a payment success rate of the payment channel, the user's preference for the payment channel, a sequence of setting payment channels by the user, etc. In such case, when the user makes payment, pre-sorted payment channels are recommended to the user. The priorities of these payment channels are predetermined and fixed, for example, the first-order payment channel is specified, or multiple payment channels are sorted for the user to select. However, during actual payment, multiple users usually do not make payment in the order of the recommended payment channels, or the users re-select a payment channel from the recommended payment channels, or are not willing to select these recommended payment channels at all, but re-select a payment channel from other payment channels that are not recommended. In addition, the user is usually unfamiliar with the transaction environment. After the payment channel re-selected by the user is used, the payment is often unsmooth or even fails. As a result, based on these payment channel recommendation solutions in the existing technology, there is a gap between the recommendation result and the business objective. In other words, multiple channels with high payment success rates that the user is willing to select cannot be accurately recommended in a timely way.

Based on the previous description, the inventor finds, by deeply researching and analyzing a large amount of transaction data, that the transaction data usually includes abundant information, such as abundant payment channel history information, abundant user history information, and crossing information between these two types of information. The payment channel history information can include various features of the payment channel being used in historical payment, such as the user group characteristic of the payment channel, the information about the payment success rate of the payment channel in different transaction environments, and the proportion of the payment channel in all transactions. The user history information can include various performance of the user in historical payment, for example, the user's own characteristics (such as age, sex, occupation, habit, etc.), the average payment amount, the total transaction amount, the number of transactions, the type and distribution of used devices, whether the previous payment is successful, which payment channel is used for payment, and the opened payment channel. The crossing information can include the historical performance of the user using the payment channel, for example, the number of successful payments by the user using the payment channel, the time of payment failure by the user using the payment channel, the time of the last payment by the user using the payment channel, and whether the last payment by the user using the payment channel is successful.

Therefore, in the payment channel recommendation solution, the inventor uses the payment channel sorting policy shown in FIG. 1 when determining the relationships between the payment channels and the recommendation scores. The overall idea of the sorting policy is as follows: The payment success rates and the user's selections (i.e., the user willingness rate) corresponding to the payment channels in the historical recommendations are extracted from the transaction information, and are used to determine whether the historically recommended payment channels were selected by the user and whether the payments were successful. Then, the decision results are used as the payment result features for use in training the sorting policy of payment channels through positive feedback. As such, in the sorting policy of payment channels, the input features used for the training include not only the payment features but also the payment success rates and the user willingness rates of the historically recommended payment channels. The payment features can include the payment performance of the user using the payment channel, that is, the payment features include the crossing features between the user and the payment channel. Therefore, after the sorting policy of payment channels is trained through positive feedback, during payment process, the payment channel with a high payment success rate that may be selected by user can be accurately determined based on the target user and the target payment channel in a timely way, and then be recommended. As such, the output result of the recommendation can directly satisfy the business demand, thereby improving the payment success rate of transaction settlement, reducing the possibility of re-selecting the recommended payment channels by the user, and further improving the payment efficiency and the user's payment experience.

Figure 2:
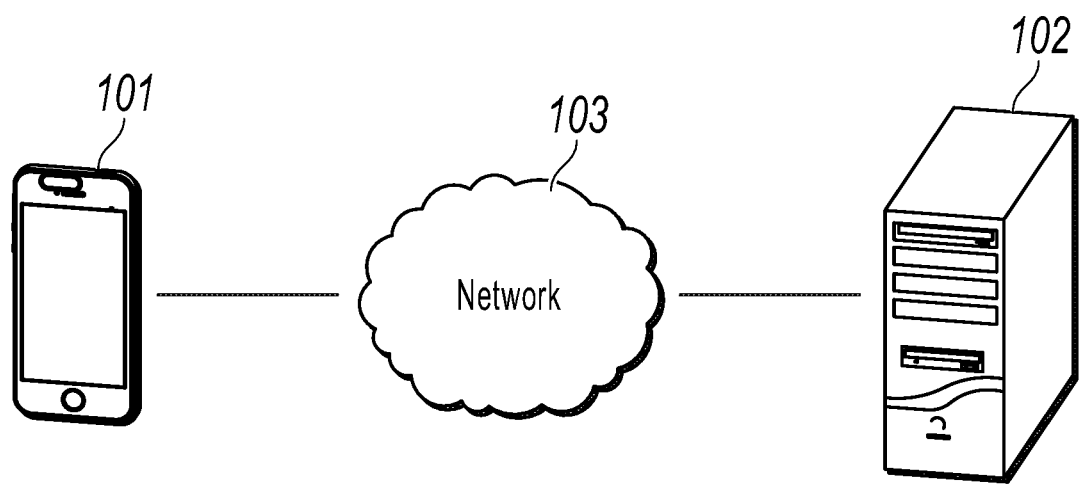
FIG. 2 is a schematic diagram illustrating an application environment for a payment channel recommendation method, according to an implementation of the present specification.

The overall idea of the payment channel recommendation method provided in the implementation of the present specification can be implemented by using the schematic diagram illustrating the application environment shown in FIG. 2. As shown in FIG. 2, a terminal device 101 performs data communication with a server 102 through a network 103. The network 103 can include a network for Internet communication, such as a wide area network, a metropolitan area network, or a local area network. The terminal device 101 can be configured to obtain a payment request for transaction settlement, such as a cashier for transaction settlement in a physical shopping mall, or a personal device such as a computer, a mobile smartphone, or a tablet computer for online shopping. The server 102 can include multiple servers for payment. As such, big data information related to the payment channel can be provided to the terminal device 101 based on the big data for payment.

During specific implementation, in terms of device, the payment channel recommendation method provided in the implementation of the present disclosure can be performed independently by the terminal device 101, or jointly by the terminal device 101 and the server 102 through the network 103.

In addition, in terms of program implementation, the payment channel recommendation method provided in the implementation of the present specification can be performed by a program installed in the terminal device 101. The program can be used as a payment program for transaction settlement, and can be an independent program or an auxiliary program.

On the one hand, the overall process of independently recommending a payment channel by the terminal device 101 is illustrated as follows:

First, based on a monitoring result, it is determined that a payment request is received. Then, a target user corresponding to the payment request and multiple target payment channels corresponding to the payment request are determined from the current transaction payment based on the payment request. Then, corresponding payment features are obtained based on the target user and the multiple target payment channels, where the payment features include crossing features between the target user and the target payment channel, and the crossing features are used to represent the performance of the target user when making payment by using the target payment channel. Then, a recommendation score corresponding to each of the multiple target payment channels is determined based on a predetermined mapping relationship and the payment features, where the mapping relationship is a mapping relationship between the payment channel and the recommendation score that is predetermined based on the payment features and the payment result, and the payment result includes result data specifying whether the payment channel is selected by the user and whether payment is successful. Finally, the target payment channel is recommended based on the recommendation score in order to complete current transaction settlement.

It is worthwhile to note that, the mapping relationship can be provided in advance by the server 102 to the terminal device 101, and the payment features can also be provided in advance by the server 102 to the terminal device 101. Certainly, in the payment channel recommendation, the terminal device 101 can further follow the server 102 to update the mapping relationship and the payment features.

On the one hand, the overall process of jointly recommending a payment channel by the terminal device 101 and the server 102 through the network 103 is illustrated as follows:

First, based on a monitoring result, the terminal device 101 determines that a payment request is received, and sends the payment request to the server 102. The server 102 determines a target user corresponding to the payment request and multiple target payment channels corresponding to the payment request from the current transaction payment. Then, the server 102 obtains corresponding payment features based on the target user and the multiple target payment channels, where the payment features include crossing features between the target user and the target payment channel, and the crossing features are used to represent the performance of the target user when making payment by using the target payment channel. Then, the server 102 determines a recommendation score corresponding to each of the multiple target payment channels based on a predetermined mapping relationship and the payment features, where the mapping relationship is a mapping relationship between the payment channel and the recommendation score that is predetermined based on the payment features and the payment result, and the payment result includes result data specifying whether the payment channel is selected by the user and whether payment is successful. Finally, the server 102 recommends the target payment channel to the terminal device 101 based on the recommendation score in order to complete current transaction settlement.

It is worthwhile to note that, the server 102 can also pre-configure the mapping relationship in the terminal device 101, so that the terminal device 101 can determine the recommendation score based on the mapping relationship, and the server 102 can perform big data processing such as determining the payment features and determining the mapping relationship. Details are omitted here for simplicity.

The following describes in detail the technical solutions provided in the implementations of the present application with reference to the accompanying drawings.

Figure 3:
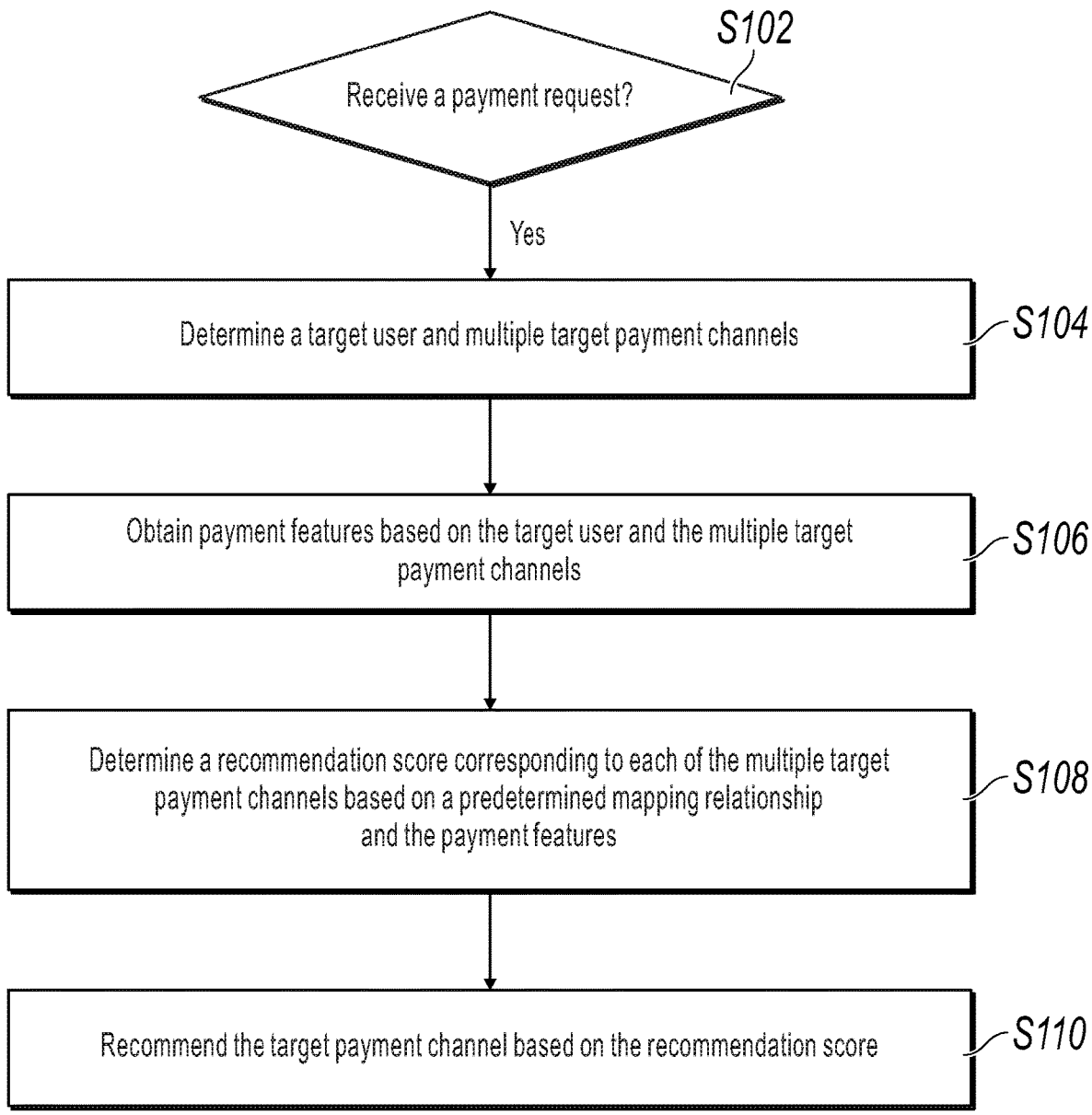
FIG. 3 is a flowchart illustrating a payment channel recommendation method, according to an implementation of the present specification.

An implementation of the present specification provides a payment channel recommendation method. As shown in FIG. 3, the method can include the following:

S102: Determine whether a payment request is received.

The payment request is a request for payment for transaction settlement, and can include information needed for payment, such as order data, user information, and merchant information.

During specific implementation, whether the payment request for transaction settlement is received can be determined by using a monitoring method based on an actual application scenario. For example, in an offline scenario, a cashier of the merchant can generate the payment request based on the transaction information. In such case, it can be monitored whether the cashier generates the payment request. For another example, in an online scenario, after a user determines to submit an order, the shopping platform generates a payment request based on the order. In such case, it can be monitored whether the user determines to submit the order. Therefore, it can be determined, through monitoring in a timely way, whether the payment request is received, to facilitate later processing after the payment request is received.

S104: Determine a target user corresponding to the payment request and multiple target payment channels corresponding to the payment request.

The target user is a user making payment. The target payment channel is a payment channel that may be used by the target user in payment. Payment channels can include channels used during payment process, such as an account (such as an account balance or an account wallet), a bank card (such as a debit card or a credit card), a coupon (such as a discount coupon or a credit coupon), a red envelope, a bonus point, etc.

During specific implementation, the target payment channel can include the payment channel that has been opened by the target user on the payment platform, and can also include the payment channel that the target user has not opened but may be willing to select.

In an implementation, when multiple target payment channels are determined, the payment channels supported by the merchant during funds collection on the payment platform and the payment channels opened by the user on the payment platform can be first determined, and then the intersection of the payment channels supported by the merchant and the payment channels opened by the user can be used as the multiple target payment channels. For example, the payment channels that have been opened by the user on the ALIPAY platform include an account balance, Ant Credit Pay, YU'E BAO, and a bank card and coupon. The payment channels supported by the merchant include an account balance, YU'E BAO, and a bank card and bonus point. In such case, the account balance, YU'E BAO, and the bank card can be determined as the target payment channels corresponding to the payment request.

In another implementation, when multiple target payment channels are determined, the payment channels that need to be promoted can be further added to the set of the target payment channels based on the characteristics of the target user, so as to promote new payment channels that the target user may be willing to select to the target user. For example, the coupon channels can be promoted based on marketing needs, so that new payment channels can be promoted and new payment experience can be provided for the user.

S106: Obtain payment features based on the target user and the multiple target payment channels.

The payment features are used to represent the historical performance of the user and the payment channels in payment. The payment features include crossing features between the user and the payment channel, where the crossing features are used to represent the historical performance of the user using the payment channel for payment, for example, the number of successful payments by the user using the payment channel, the time of payment failure by the user using the payment channel, the time of the last payment by the user using the payment channel, and whether the last payment by the user using the payment channel is successful. As such, in the current transaction, the historical performance can be used as the basis for predicting the target payment channel that the target user may use.

In an implementation, the payment features can further include user features corresponding to the user and channel features corresponding to the payment channel. That is, the user features corresponding to the target user can be determined based on the target user, the channel features corresponding to the target payment channel can be determined based on the target payment channel, and corresponding crossing features can be determined based on the target user and the target payment channel. The user features are used to represent the user's historical performance in payment, for example, the user's own characteristics (such as age, sex, occupation, consumption habit, etc.), the average payment amount, the total transaction amount, the number of transactions, the type and distribution of used devices, whether the previous payment is successful, which payment channel is used for payment, and the opened payment channel. The channel features are used to represent the historical performance of the payment channel being used in payment, such as the user group characteristic of the payment channel, the information about the payment success rate of the payment channel in different transaction environments, and the proportion of the payment channel in all transactions. Therefore, the user features and the channel features can also be used as the payment features to better represent the historical performance of the user and the payment channel in payment.

The user features of each user, the channel features of each payment channel, and the crossing features between the user and the payment channel are determined, so that in each transaction, the user has the corresponding feature values, the payment channel has the corresponding feature values, and the transaction record has the corresponding crossing feature values. Therefore, possible performance of the user and the payment channel in the current transaction environment can be better reflected based on the payment features determined by the target user and the target payment channel, thereby improving the payment success rate and the user willingness rate of the recommended payment channel, and further providing positive feedback by using the payment success rate and the user willingness rate, to perform adversarial training on the sorting policy of payment channels and strengthen the effectiveness of the positive feedback to the sorting policy.

During specific implementation, the payment features are obtained and determined from the collected transaction information, and can be selected based on the actual application objective. For example, the application is mature, and the user and the payment channel tend to be stable. In such case, the payment channel needs to be recommended more accurately to ensure the payment efficiency and user experience. Therefore, the payment features can include the user features, the channel features, and the crossing features, so that the payment features are more abundant, and the payment channel is further recommended more accurately based on big data of the abundant payment features. For another example, when the application starts to be used, the user data and the payment channel data are less, but multiple payment channels need to be promoted to satisfy the user's selection demand. In such case, the payment features can include the channel features and the crossing features, so that the payment channels with a high payment success rate that are selected by many users can be recommended, or the promoted target payment channels can be recommended to further strengthen the positive feedback of these payment channels and finally reach the application objective. For another example, the application needs to target multiple user groups. In such case, the payment features can include the user features and the crossing features, so that the recommendation is more pertinent. No enumeration is provided here.

In an implementation, the payment features can be obtained from the database.

During specific implementation, the payment features can be obtained from the database by processing big data of transactions. First, the transaction data can be collected by using the log system, then the payment features are extracted from the transaction data by using a big data processing platform, and finally the payment features are stored in the database for query. Here, the log system can be Logtail (Alibaba Cloud Log Collection Agent), and the data processing platform can be Open Data Processing Service (ODPS). In addition, depending on an actual application demand, databases such as MySQL and Hbase can be used to store the payment features. Hbase is a high-reliability, high-performance, column-oriented, and scalable distributed storage system. By using Hbase, a large-scale structured storage cluster can be created on an affordable PC server. MySQL is a relational database management system in which data is stored in different tables to increase a query speed and flexibility.

S108: Determine a recommendation score corresponding to each of the multiple target payment channels based on a predetermined mapping relationship and the payment features.

The mapping relationship (i.e., the previous sorting policy) is predetermined based on historical data of the payment features and historical data of the payment result features, and is used to represent a relationship between the payment channel and the recommendation score. The payment result features include result data specifying whether the payment channel is selected by a user and whether payment is successful.

During specific implementation, the payment success rate and the user willingness rate of the historically recommended payment channels can be further obtained from the collected historical transaction data, and the historical output (i.e., the historically recommended payment channels) can be determined based on the payment success rate and the user willingness rate, and the payment result features can be generated. The payment result features are used as positive feedback input of the mapping relationship to perform input feedback to the mapping relationship positively. In other words, the user's willingness of selecting each payment channel (i.e., the user willingness rate) and the payment success rate of each recommended payment channel in the final payment are both reflected in the mapping relationship to provide positive feedback on the payment channel recommendation process. As such, in transaction settlement payment, the mapping relationship can be used in the current transaction environment to score each target payment channel and determine an order of recommending each target payment channel.

It is worthwhile to note that, the recommendation score can be expressed as a percentage, for example, the recommendation score is 90, and the normalization coefficient can also be used, for example, the recommendation score is 0.9, which is not limited here.

S110: Recommend the target payment channel based on the recommendation score.

During specific implementation, the corresponding target payment channels can be sorted and output based on the recommendation scores, to respond to the payment request and facilitate transaction calculation. During the sorting and outputting, the target payment channels corresponding to the recommendation scores can be output in descending order of the recommendation scores.

In an implementation, a payment channel that satisfies a predetermined demand can also be recommended depending on an actual application demand, to reduce the total number of recommended payment channels, so as to facilitate the user's browsing and decision-making process. For example, a recommendation score threshold is set, and then it is determined whether the recommendation score corresponding to the target payment channel satisfies the recommendation score threshold. Only a payment channel that satisfies the recommendation score threshold is recommended, and a payment channel that does not satisfy the recommendation score threshold is not recommended. For another example, the number N (N is a positive integer) of recommended payment channels is predetermined, and then the first N payment channels are selected from the sorted payment channels in descending order for recommendation.

In the previous steps S102 to S110, the payment success rate and the user willingness rate of the historically recommended payment channels are positively fed back to the mapping relationship, so that effective adversarial training is performed on the mapping relationship through positive feedback. As such, during payment process, the recommendation order of each target payment channel can be accurately determined in a timely way based on the mapping relationship, thereby improving the payment success rate, reducing the possibility of re-selection by the user, and further improving the payment efficiency and the user's payment experience.

During specific implementation, the previous steps S102 to S110 can serve as a payment decision-making process. As such, after determining that the payment request is received, the payment decision-making process can make decisions on availability, visibility, a sorting order, default selection, etc. of the target payment channel in the current transaction based on the payment request, and then recommend the payment channel with a high payment success rate that may be selected by the target user in the current transaction environment.

For ease of understanding, the following examples are given here for description: Assume that in the current transaction, the target user is user A and there are three target payment channels. In such case, the payment features of the current transaction can be determined first, then the recommendation scores corresponding to the three target payment channels are separately determined based on the mapping relationship, and finally recommendation is made based on the recommendation scores.

The first group of payment feature values are formed by the user features of user A, the channel features of payment channel 1, and the crossing features of user A and payment channel 1. Then the first group of payment feature values are used to predict the score of payment channel 1 based on the existing mapping relationship, to obtain the recommendation score corresponding to payment channel 1. For example, the recommendation score of payment channel 1 is 90. Similarly, the second group of payment feature values are formed by the user features of user A, the channel features of payment channel 2, and the crossing features of user A and payment channel 2. Then the second group of payment feature values are used to predict the score of the payment channel 2 based on the existing mapping relationship. For example, the recommendation score of payment channel 2 is 95. In addition, the third group of payment feature values are formed by the user features of user A, the channel features of payment channel 3, and the crossing features of user A and payment channel 3. Then the third group of payment feature values are used to predict the score of the payment channel 3 based on the existing mapping relationship. For example, the recommendation score of payment channel 3 is 86. Therefore, the recommendation scores can be sorted (for example, in descending order) and then output. That is, when user A makes payment in the current transaction, the order of the obtained recommendation results of payment channels 1 to 3 is payment channel 2, payment channel 1, and payment channel 3.

In addition, after payment channels 1 to 3 are recommended in the order of the previous results, user A finally selects payment channel 3 for payment, and the payment is successful. In such case, the payment success rates and the user willingness rates of payment channel 1 and payment channel 2 are at a very low level (for example, zero), whereas the payment success rate and the user willingness rate of payment channel 3 are at a high level (for example, 1). As such, based on the payment result features in the transaction, the final payment result can be used to adjust the mapping relationship, that is, the payment success rates and the user willingness rates corresponding to payment channels 1 to 3, and to perform adversarial training on the mapping relationship. After continuous adversarial training, the mapping relationship can reflect the relationship between the payment channel and the recommendation score more accurately. Therefore, in later transaction payment, if the payment features of the transaction are similar to the payment features of the historical transaction (such as the same or similar degree reaches the threshold), the similar payment channel can be recommended first, for example, payment channel 3 is also recommended.

Figure 4:
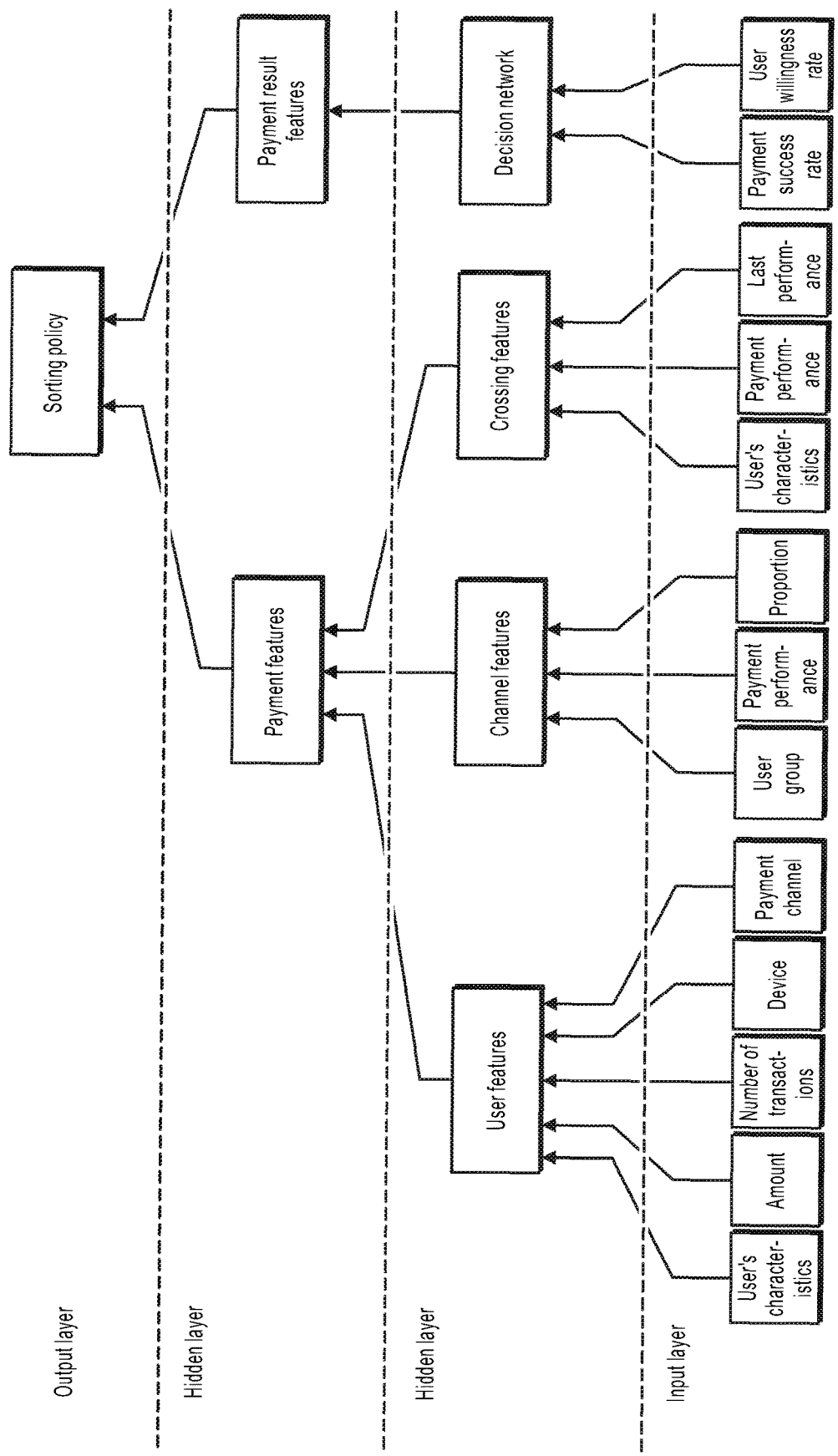
FIG. 4 is a schematic structural diagram illustrating a deep neural network in a payment channel recommendation method, according to an implementation of the present specification.

In an implementation, the mapping relationship can be preferably obtained by using a deep neural network (DNN). The schematic structural diagram of the DNN can be shown in FIG. 4, where a decision layer (i.e., a decision network) is added to a conventional DNN, for example, a decision network is added to a hidden layer. As such, a payment success rate and a user willingness rate corresponding to a DNN output result (i.e., a payment channel recommended based on a sorting policy) are obtained from the transaction data, and then payment result features can be obtained through the decision network by using the obtained payment success rate and user willingness rate. Finally, the DNN is trained jointly by using the payment features and the payment result features, effectively utilizing transaction result data and improving DNN prediction accuracy. Adversarial training can be performed on the output layer of the DNN by using the payment result features as the input features of the positive feedback. As such, the output layer can be trained not only by using the historical payment features, but also by using the historical payment result features (i.e., the decision result of the payment success rate and the user willingness rate for the output result). In addition, adversarial training can be performed on the output layer by using the payment result features after the current recommendation, so that the output result of the DNN can directly reach the application objective after continuous adversarial training. In other words, the payment channel with a high payment success rate that the user is willing to select can be accurately determined and output in a timely way by using the DNN output layer.

It is worthwhile to note that, the user features, the channel features, and the crossing features can be selected from the transaction data through featurization techniques depending on an actual application demand, and then the extracted features can be input into the connection layer (such as the hidden layer). Here, for ease of description and understanding, the user features include the user's own characteristics (such as sex, age, occupation, consumption habit, etc.), payment amounts (such as a per-payment amount, a total amount, etc.), the number of payments, devices used for payment (such as device types, distribution of device types, etc.), and payment channels (such as opened payment channels, commonly used payment channels, channels with a high payment success rate, a payment channel last used, etc.). The channel features include the user group characteristics (such as age, consumption habit, occupation, etc.) of the payment channel, success rate results (such as the number of successful payments, the number of failed payments, time of payment success, time of payment failure, whether the last payment is successful, etc.), and proportion results (such as a proportion, a success rate, or a failure rate in all transactions). The crossing features include the number of successful payments, the time of payment success, the time of payment failure, and the last performance (such as whether the payment is successful, a payment amount) when the user uses the payment channel to make payment.

In a preferred implementation, an AB test can be performed to split the payment requests of transaction settlement. In other words, the AB test can be used to recommend the payment channel. Split-run testing through the AB test can reduce the demand of payment channel recommendation for the processing capability of the device. In addition, the transaction data after AB grouping can be collected and statistics calculation can be performed on the transaction data, thereby further increasing the pertinency of payment channel recommendation and better satisfying the marketing demands of actual applications.

During specific implementation, after the recommendation score is determined in the AB test, the recommendation score can further be adjusted depending on the application demand before the recommendation. In other words, the recommendation score determined based on the mapping relationship can be adjusted based on a predetermined score adjustment policy, and then the payment channel can be recommended. For example, when an application needs to market for a certain type of user, there may be no user data at an early stage, and the marketing effect is not ideal. In such case, split-run testing can be performed by using the AB test to obtain more user data of such type, but the recommendation score of the payment channel for such type of user is usually not high. In such case, the recommendation score corresponding to the payment channel for such type of user can be adjusted. For example, during promotion of Ant Credit Pay, users who are willing to use Ant Credit Pay are usually young people. Therefore, the young users can be directed to the payments with Ant Credit Pay through split-run testing by using the AB test. However, at the early stage, the recommendation score corresponding to Ant Credit Pay may not be high, for example, 60. However, the recommendation score of YU'E BAO is 90, and the recommendation score of the bank card is 80. During marketing, Ant Credit Pay needs to be recommended to users. In such case, the recommendation score of Ant Credit Pay can be adjusted, for example, be changed to 85. As such, the possibility of payment using YU'E BAO by the user is not affected, and Ant Credit Pay that may be used by the user is placed in a front recommendation order to increase exposure of Ant Credit Pay, and further provide the user with a new payment option.

Figure 5:
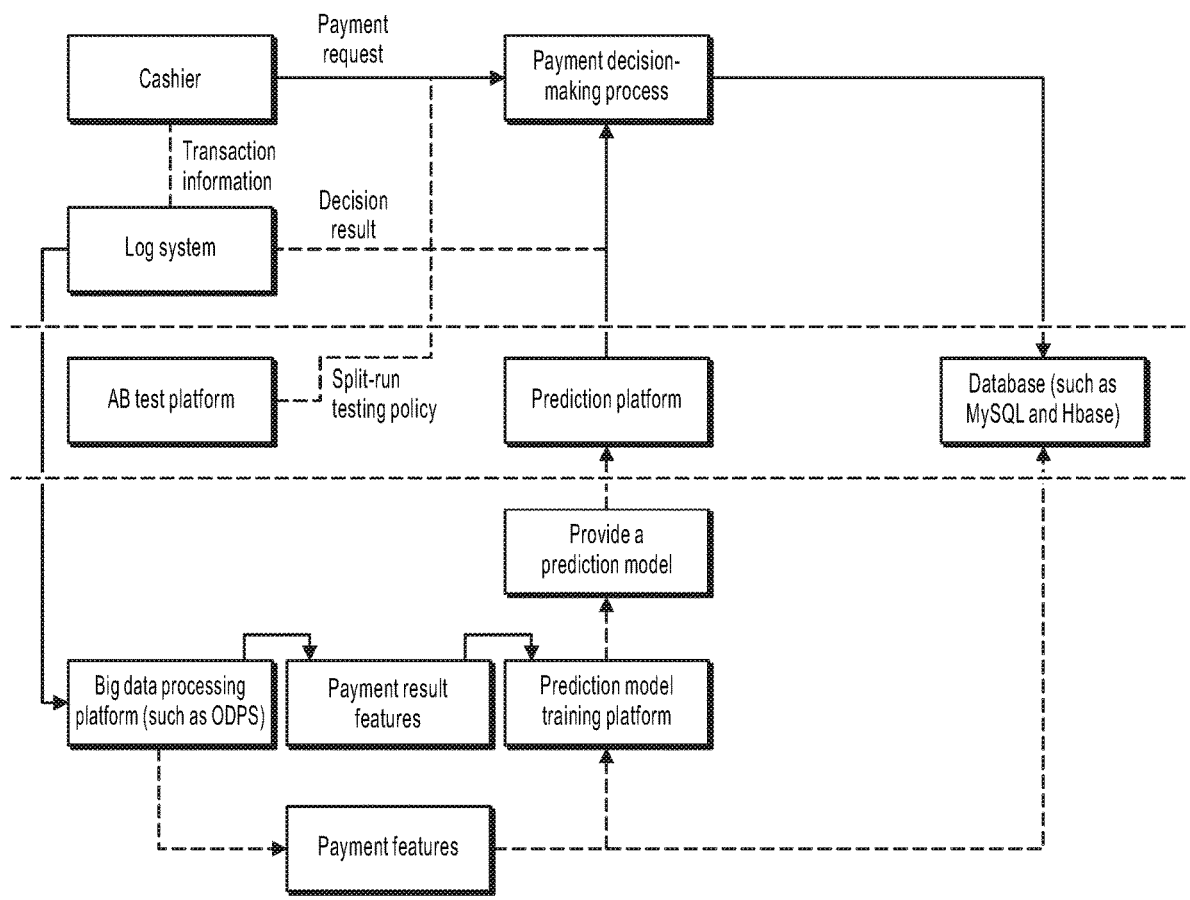
FIG. 5 is a schematic diagram illustrating a system structure of a payment channel recommendation method, according to an implementation of the present specification.

For ease of understanding, the following provides a schematic diagram illustrating a system structure of a payment channel recommendation method, according to an implementation of the present specification. As shown in FIG. 5, during transaction settlement, a cashier generates a payment request. After receiving the payment request, a payment decision-making process determines a target user, a target payment channel, and payment features, for example, requests the target user, the target payment channel, and the payment features corresponding to the current transaction from the database (such as My SQL or Hbase), and requests a prediction result of the recommendation score from a prediction platform (such as an online scoring platform) based on the payment features. As such, the payment decision-making process can recommend the target payment channel to the cashier after obtaining the recommendation score, and the cashier can render the target payment channel and complete payment for the current transaction. In addition, the log system (such as Logtail) can further be used to collect transaction-related information, for example, collecting the transaction information of the cashier and collecting the decision result (such as the recommendation score and the split-run testing result of the AB test) of the payment decision-making process, and then send the collected transaction-related information to the big data processing platform (such as ODPS) for big data processing. The big data processing can include featurization processing, association processing of transaction information, etc. As such, the payment features and the payment result features are obtained through featurization processing, and the features are input into the training platform of the prediction model. The payment features and the payment result features are used to train the prediction model (i.e., the mapping relationship) offline. The payment features can also be stored in the database for easy query and acquisition. After the prediction mode is trained offline, the prediction model can be provided to the prediction platform depending on the application demand, to update the prediction model used by the prediction platform. In addition, depending on the application demand, the AB test platform can be used to push the split-run testing policy to the payment decision-making process, so that the payment decision-making process can perform AB test processing on the payment request based on the split-run testing policy. During specific implementation, as shown in the hierarchy in the figure (such as layer division by two bold black dashed lines in the figure), the AB test platform, the prediction platform, and the database can be set as back-end online processing services, the log system and the payment decision-making process can be set as front-end services, and the big data processing platform, the prediction model training platform, and providing the prediction model can be set as back-end offline processing services.

Based on the same inventive concept, implementations of the present specification further provide a payment channel recommendation apparatus, an electronic device, and a non-volatile computer storage medium for payment channel recommendation.

In consideration of the detailed description of the payment channel recommendation method in the previous implementations, the corresponding content related to the apparatus, the device, and the non-volatile computer storage medium will be omitted in the following implementations.

Figure 6:
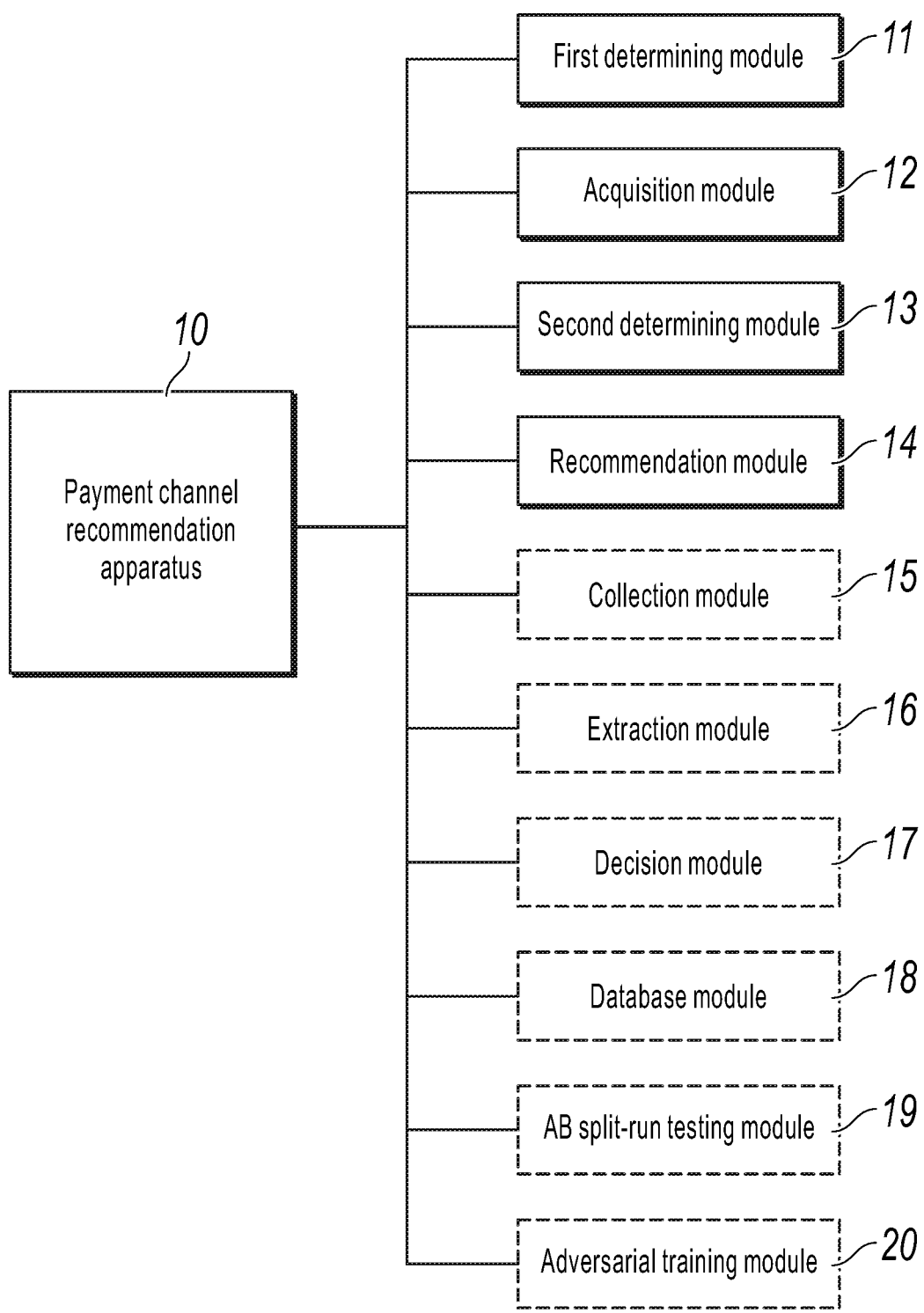
FIG. 6 is a schematic structural diagram illustrating a payment channel recommendation apparatus, according to an implementation of the present specification.

As shown in FIG. 6, the dashed-line block represents an optional module, and the payment channel recommendation apparatus 10 includes a first determining module 11, an acquisition module 12, a second determining module 13, and a recommendation module 14. The first determining module 11 is configured to: when a payment request is received, determine a target user corresponding to the payment request and multiple target payment channels corresponding to the payment request. The acquisition module 12 is configured to obtain payment features based on the target user and the multiple target payment channels, where the payment features include crossing features between the target user and the target payment channel, and the crossing features are used to represent historical performance of the target user when making payment by using the target payment channel. The second determining module 13 is configured to determine a recommendation score corresponding to each of the multiple target payment channels based on a mapping relationship and based on the payment features, where the mapping relationship is predetermined through training on the payment features and payment result features, and is used to represent relationships between the payment channels and the recommendation scores, and the payment result features include result data specifying whether the payment channel is selected by a user and whether payment is successful. The recommendation module 14 is configured to recommend the target payment channel based on the recommendation score.

Optionally, the payment features further include user features, and the user features are used to represent the user's historical performance in payment. In such case, the acquisition module 12 is configured to obtain the user features corresponding to the target user based on the target user, and obtain the crossing features based on the target user and the multiple target payment channels.

Optionally, the payment features further include channel features, and the channel features are used to represent historical performance of a payment channel being used in payment. In such case, the acquisition module 12 is configured to obtain the channel features corresponding to multiple target payment channels based on the multiple target payment channels, and obtain the crossing features based on the target user and the multiple target payment channels.

Optionally, the payment channel recommendation apparatus 10 can further include a collection module 15, an extraction module 16, and a decision module 17. The collection module 15 is configured to collect transaction information after the recommendation module 14 recommends the target payment channel based on the recommendation score. The extraction module 16 is configured to extract a user willingness rate and a payment success rate corresponding to the recommended target payment channel from the transaction information. The decision module 17 is configured to generate the payment result features based on the user willingness rate and the payment success rate.

Optionally, the payment channel recommendation apparatus 10 can further include a database module 18. The extraction module 16 is further configured to extract the payment features from the transaction information. The database module 18 is configured to store the payment features in a database.

Optionally, the payment channel recommendation apparatus 10 can further include an AB split-run testing module 19. The AB split-run testing module 19 is configured to perform an AB test on the payment request based on a predetermined split-run testing policy.

Optionally, the mapping relationship is a mapping relationship obtained based on a deep neural network. In such case, the payment channel recommendation apparatus 10 can further include an adversarial training module 20. The adversarial training module 20 is configured to perform adversarial training on the deep neural network based on the payment result features of the recommended target payment channel.

Based on the same inventive concept, an implementation of the present specification provides a payment channel recommendation electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: when a payment request is received, determining a target user corresponding to the payment request and multiple target payment channels corresponding to the payment request; obtaining payment features based on the target user and the multiple target payment channels, where the payment features include crossing features between the target user and the target payment channels, and the crossing features are used to represent historical performance of payment made by the target user by using the target payment channels; determining a recommendation score corresponding to each of the multiple target payment channels based on a mapping relationship and based on the payment features, where the mapping relationship is predetermined through training on historical data of the payment features and historical data of payment result features, and is used to represent relationships between the payment channels and the recommendation scores, and the payment result features include result data specifying whether the payment channel is selected by a user and whether payment is successful; and recommending the target payment channel based on the recommendation score.

Based on the same idea, an implementation of the present specification provides a non-volatile computer storage medium for recommending a payment channel, where the non-volatile computer storage medium stores a computer executable instruction, and the computer executable instruction is set to perform the following operations: when a payment request is received, determining a target user corresponding to the payment request and multiple target payment channels corresponding to the payment request; obtaining payment features based on the target user and the multiple target payment channels, where the payment features include crossing features between the target user and the target payment channels, and the crossing features are used to represent historical performance of payment made by the target user by using the target payment channels; determining a recommendation score corresponding to each of the multiple target payment channels based on a mapping relationship and based on the payment features, where the mapping relationship is predetermined through training on historical data of the payment features and historical data of payment result features, and is used to represent relationships between the payment channels and the recommendation scores, and the payment result features include result data specifying whether the payment channel is selected by a user and whether payment is successful; and recommending the target payment channel based on the recommendation score.

Specific implementations of the present specification are described above. Other implementations fall within the scope of the appended claims. In multiple situations, the actions or steps described in the claims can be performed in an order different from the order in the implementations and the desired results can still be achieved. In addition, the process depicted in the accompanying drawings does not necessarily need a particular execution order to achieve the desired results. In multiple implementations, multi-tasking and concurrent processing is feasible or can be advantageous.

The implementations in the present specification are described in a progressive way. For same or similar parts of the implementations, references can be made to the implementations mutually. Each implementation focuses on a difference from other implementations. Especially, an apparatus implementation, a device implementation, a non-volatile computer storage medium implementation are similar to a method implementation, and therefore are described briefly. For related parts, references can be made to the descriptions in the method implementation.

The apparatus, the device, and the non-volatile computer storage medium provided in the implementations of the present specification correspond to the method. Therefore, the apparatus, the device, and the non-volatile computer storage medium also have beneficial technical effects similar to those of the corresponding method. The beneficial technical effects of the method are described in detail above, so the beneficial technical effects of the corresponding apparatus, device, and non-volatile computer storage medium are omitted here.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that the implementations of the present disclosure can be provided as a method, a system, or a computer program product. Therefore, the present disclosure may use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of executable computer instructions executed by a computer, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
receiving, by one or more computing devices executing a payment decision-making process of a front-end service layer, a payment request;
determining a target user corresponding to the payment request and a plurality of payment channels corresponding to the payment request;
obtaining payment features based on the target user and the plurality of payment channels,
wherein the payment features comprise features representing historical characteristics of one or more payments made by the target user using one or more of the plurality of payment channels, and
wherein the payment features are obtained from a database operating in a back-end online service layer;
training a prediction model using a deep neural network operating in a back-end offline service layer, the deep neural network comprising a first hidden layer and a second hidden layer,
wherein the first hidden layer comprises a decision network, and wherein training the prediction model comprises
inputting, into the decision network, data indicating, for each of one or more historical transactions, whether a first payment channel of the plurality of payment channels is selected by a user and whether payment is successful, and
receiving, as an input of the second hidden layer, an output of the decision network based on the data input into the decision network;
inputting the payment features into the prediction model operating in the back-end online service layer, the prediction model generating a recommendation score corresponding to each of the plurality of payment channels, wherein the prediction model represents mappings between the plurality of payment channels and corresponding recommendation scores;
receiving, from an AB test process of the back-end online service layer, a testing policy;
determining that the target user is included in a target group of the testing policy and that a second payment channel of the plurality of payment channels is a subject of the testing policy, and that the testing policy dictates that a recommendation score corresponding to the second payment channel is adjusted to increase or decrease an exposure of the second payment channel to the target user;
quantitatively adjusting the recommendation score corresponding to the second payment channel based on the testing policy, to obtain an adjusted recommendation score corresponding to the second payment channel; and
recommending two or more payment channels to the target user,
wherein the two or more payment channels include the second payment channel and at least one other payment channel of the plurality of payment channels, and
wherein the two or more payment channels are recommended in an order corresponding to the respective recommendation scores of the two or more payment channels, including the adjusted recommendation score corresponding to the second payment channel.

2. The computer-implemented method of claim 1, wherein the payment features further comprise features representing historical payment characteristics of the target user.

3. The computer-implemented method of claim 1, wherein the payment features further comprise features representing historical payment characteristics of the plurality of payment channels.

4. The computer-implemented method of claim 1, further comprising, subsequent to recommending the two or more payment channels to the target user:
collecting transaction information corresponding to the payment request;
extracting, from the transaction information, a user willingness rate and a payment success rate;
generating, based on the user willingness rate and the payment success rate, new payment result feature data; and
training the prediction model based on the new payment result feature data.

5. The computer-implemented method of claim 4, further comprising: storing the new payment result feature data in the database.

6. The computer-implemented method of claim 1, wherein an output layer of the deep neural network comprises the prediction model, and further comprising:
performing adversarial training on the output layer based on payment result features of at least one of the recommended two or more payment channels.

7. The computer-implemented method of claim 1, wherein training the prediction model using the deep neural network comprises:
jointly transforming, in the first hidden layer, a first plurality of payment features representing past payment information of the target user, to obtain a first intermediate output; and
jointly transforming, in the first hidden layer, a second plurality of payment features representing past payment information of the first payment channel, to obtain a second intermediate output.

8. The computer-implemented method of claim 7, wherein training the prediction model using the deep neural network comprises:
jointly transforming, in the second hidden layer, the first intermediate output and the second intermediate output, to obtain a third intermediate output.

9. The computer-implemented method of claim 8, wherein training the prediction model using the deep neural network comprises:
jointly transforming, in the first hidden layer, a third plurality of payment features representing past payment information of the target user using the first payment channel, to obtain a fourth intermediate output; and
obtaining the third intermediate output by jointly transforming, in the second hidden layer, the first intermediate output, the second intermediate output, and the fourth intermediate output.

10. A non-transitory, computer-readable medium storing one or more instructions that, when executed by one or more computing devices, cause the one or more computing devices to perform operations comprising:

receiving, by the one or more computing devices executing a payment decision-making process of a front-end service layer, a payment request;

determining a target user corresponding to the payment request and a plurality of payment channels corresponding to the payment request;

obtaining payment features based on the target user and the plurality of payment channels,
  wherein the payment features comprise features representing historical characteristics of one or more payments made by the target user using one or more of the plurality of payment channels, and
  wherein the payment features are obtained from a database operating in a back-end online service layer;

training a prediction model using a deep neural network operating in a back-end offline service layer, the deep neural network comprising a first hidden layer and a second hidden layer,
  wherein the first hidden layer comprises a decision network, and wherein training the prediction model comprises
    inputting, into the decision network, data indicating, for each of one or more historical transactions, whether a first payment channel of the plurality of payment channels is selected by a user and whether payment is successful, and
    receiving, as an input of the second hidden layer, an output of the decision network based on the data input into the decision network;

inputting the payment features into the prediction model operating in the back-end online service layer, the prediction model generating a recommendation score corresponding to each of the plurality of payment channels, wherein the prediction model represents mappings between the plurality of payment channels and corresponding recommendation scores;
  receiving, from an AB test process of the back-end online service layer, a testing policy;
  determining that the target user is included in a target group of the testing policy and that a second payment channel of the plurality of payment channels is a subject of the testing policy, and that the testing policy dictates that a recommendation score corresponding to the second payment channel is adjusted to increase or decrease an exposure of the second payment channel to the target user;
  quantitatively adjusting the recommendation score corresponding to the second payment channel based on the testing policy, to obtain an adjusted recommendation score corresponding to the second payment channel; and
  recommending two or more payment channels to the target user,
    wherein the two or more payment channels include the second payment channel and at least one other payment channel of the plurality of payment channels, and
    wherein the two or more payment channels are recommended in an order corresponding to the respective recommendation scores of the two or more payment channels, including the adjusted recommendation score corresponding to the second payment channel.

11. The non-transitory, computer-readable medium of claim 10, wherein the payment features further comprise features representing historical payment characteristics of the target user.

12. The non-transitory, computer-readable medium of claim 10, wherein the payment features further comprise features representing historical payment characteristics of the plurality of payment channels.

13. The non-transitory, computer-readable medium of claim 10, wherein the operations further comprise, subsequent to recommending the two or more payment channels to the target user:
  collecting transaction information corresponding to the payment request;
  extracting, from the transaction information, a user willingness rate and a payment success rate;
  generating, based on the user willingness rate and the payment success rate, new payment result feature data; and
  training the prediction model based on the new payment result feature data.

14. The non-transitory, computer-readable medium of claim 13, wherein the operations further comprise: storing the new payment result feature data in the database.

15. The non-transitory, computer-readable medium of claim 10, wherein an output layer of the deep neural network comprises the prediction model, and wherein the operations further comprise:
  performing adversarial training on the output layer based on payment result features of at least one of the recommended two or more payment channels.

16. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:

receiving, by the one or more computers executing a payment decision-making process of a front-end service layer, a payment request;

determining a target user corresponding to the payment request and a plurality of payment channels corresponding to the payment request;

obtaining payment features based on the target user and the plurality of payment channels,
  wherein the payment features comprise features representing historical characteristics of one or more payments made by the target user using one or more of the plurality of payment channels, and
  wherein the payment features are obtained from a database operating in a back-end online service layer;

training a prediction model using a deep neural network operating in a back-end offline service layer, the deep neural network comprising a first hidden layer and a second hidden layer,
  wherein the first hidden layer comprises a decision network, and wherein training the prediction model comprises
    inputting, into the decision network, data indicating, for each of one or more historical transactions, whether a first payment channel of the plurality of payment channels is selected by a user and whether payment is successful, and receiving, as an input of the second hidden layer, an output of the decision network based on the data input into the decision network;
inputting the payment features into the prediction model operating in the back-end online service layer, the prediction model generating a recommendation score corresponding to each of the plurality of payment channels, wherein the prediction model represents mappings between the plurality of payment channels and corresponding recommendation scores;
   receiving, from an AB test process of the back-end online service layer, a testing policy;
   determining that the target user is included in a target group of the testing policy and that a second payment channel of the plurality of payment channels is a subject of the testing policy, and that the testing policy dictates that a recommendation score corresponding to the second payment channel is adjusted to increase or decrease an exposure of the second payment channel to the target user;
   quantitatively adjusting the recommendation score corresponding to the second payment channel based on the testing policy, to obtain an adjusted recommendation score corresponding to the second payment channel; and
   recommending two or more payment channels to the target user,
     wherein the two or more payment channels include the second payment channel and at least one other payment channel of the plurality of payment channels, and
       wherein the two or more payment channels are recommended in an order corresponding to the respective recommendation scores of the two or more payment channels, including the adjusted recommendation score corresponding to the second payment channel.

17. The computer-implemented system of claim 16, wherein the payment features further comprise features representing historical payment characteristics of the target user.

18. The computer-implemented system of claim 16, wherein the payment features further comprise features representing historical payment characteristics of the plurality of payment channels.

19. The computer-implemented system of claim 16, wherein the operations further comprise, subsequent to recommending the two or more payment channels to the target user:
   collecting transaction information corresponding to the payment request;
   extracting, from the transaction information, a user willingness rate and a payment success rate;
   generating, based on the user willingness rate and the payment success rate, new payment result feature data; and
   training the prediction model based on the new payment result feature data.

20. The computer-implemented system of claim 16, wherein an output layer of the deep neural network comprises the prediction model, and wherein the operations further comprise:
   performing adversarial training on the output layer based on payment result features of at least one of the recommended two or more payment channels.

* * * * *